(12) United States Patent
Shibata

(10) Patent No.: US 9,069,234 B2
(45) Date of Patent: Jun. 30, 2015

(54) FINDER OPTICAL SYSTEM, IMAGE PICKUP APPARATUS, AND IMAGE PICKUP SYSTEM

(71) Applicant: CANON KABUSHIKI KAISHA, Tokyo (JP)

(72) Inventor: Yoshihide Shibata, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/159,669

(22) Filed: Jan. 21, 2014

(65) Prior Publication Data

US 2014/0204261 A1    Jul. 24, 2014

(30) Foreign Application Priority Data

Jan. 21, 2013   (JP) .................. 2013-008332

(51) Int. Cl.
| | | |
|---|---|---|
| *G03B 13/24* | (2006.01) | |
| *G03B 13/28* | (2006.01) | |
| *G03B 13/16* | (2006.01) | |
| *G03B 13/06* | (2006.01) | |
| *G03B 19/12* | (2006.01) | |

(52) U.S. Cl.
CPC ............... *G03B 13/24* (2013.01); *G03B 19/12* (2013.01); *G03B 13/06* (2013.01); *G03B 13/28* (2013.01); *G03B 13/16* (2013.01)

(58) Field of Classification Search
CPC ........ G03B 13/02; G03B 13/04; G03B 13/06; G03B 13/08; G03B 13/16; G03B 13/24; G03B 13/28; G03B 19/12
See application file for complete search history.

(56) References Cited

U.S. PATENT DOCUMENTS

2005/0105188 A1*  5/2005  Hayashi et al. ............... 359/619

FOREIGN PATENT DOCUMENTS

| JP | 2007-206169 A | 8/2007 |
|---|---|---|
| JP | 2009-003423 A | 1/2009 |

* cited by examiner

*Primary Examiner* — Daniel M Pasiewicz
(74) *Attorney, Agent, or Firm* — Cowan, Liebowitz & Latman, P.C.

(57) ABSTRACT

A finder optical system 20 includes a focusing glass 21 including a collection surface 21a that collects a light beam and a diffusion surface 21b that diffuses the collected light beam, an eyepiece 23 that receives a part of the diffused light beam, a photometry lens 24 arranged near the eyepiece 23, and a photometry sensor 25 on which an image of another part of the light beam diffused by the diffusion surface 21b is formed via the photometry lens 24, a plurality of micro lenses are arranged on the diffusion surface 21b of the focusing glass 21, at least one micro lens of the plurality of micro lenses has at least two radii of curvature on its cross section in a predetermined direction, and the at least one micro lens satisfies R1<R2 where R1 and R2 are radii of curvature in first and second areas, respectively.

6 Claims, 7 Drawing Sheets

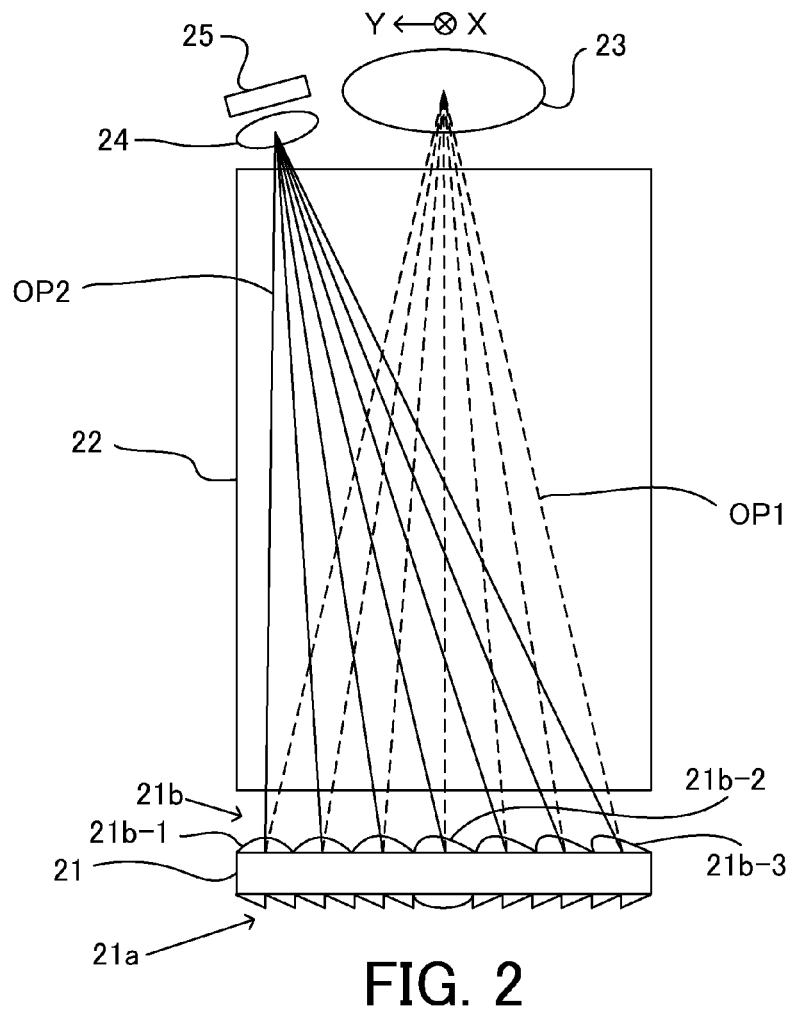
FIG. 2
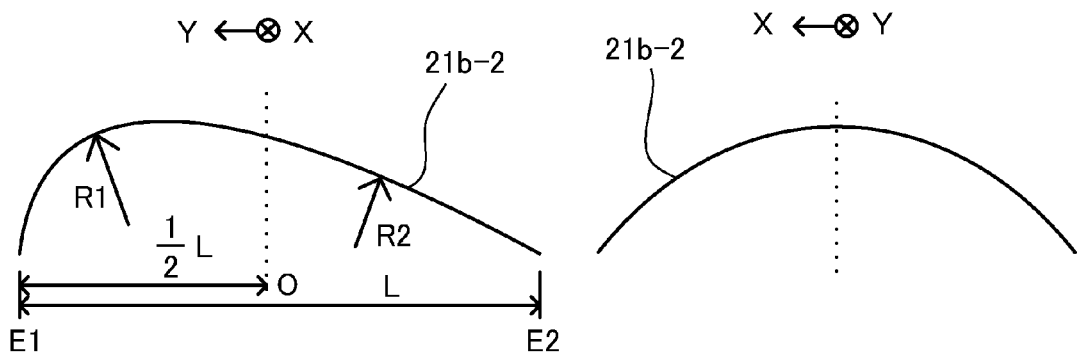
FIG. 3A
FIG. 3B

FINDER OPTICAL SYSTEM, IMAGE PICKUP APPARATUS, AND IMAGE PICKUP SYSTEM

BACKGROUND OF THE INVENTION

1. Field of the Invention

The present invention relates to a finder optical system used for an image pickup apparatus.

2. Description of the Related Art

A single lens reflex camera has a focusing glass arranged at a position (a primary imaging plane) conjugate to an imaging sensor which shoots an object image passing through an imaging lens. The light beam of an object image is collected in a direction toward an eyepiece by the action of the collection surface (Fresnel lens) of the focusing glass. The light beam is then acted upon by the diffusion surface (micro lenses) of the focusing glass to be diffusion light, and finally reaches the eyepiece.

An image of a part of the diffusion light is secondarily formed by a photometry lens on a photometry sensor which measures the brightness of an object. The use of this phenomenon makes it possible to measure the brightness of an object. As described above, a single lens reflex camera is designed to cause the light beam of an object image formed on its focusing glass to reach both of its finder optical system and its photometric system. This design requires improving photometric performance while maintaining a sufficient brightness of the finder by efficiently distributing the light beam of an object image which passes through the focusing glass in directions toward the eyepiece and the photometry lens.

Japanese Patent Laid-Open No. 2007-206169 discloses a configuration in which photometric properties are improved by the arrangement in which two kinds of Fresnel lenses whose focal lengths and light collection directions are different from each other are combined. Japanese Patent Laid-Open No. 2009-3423 discloses a configuration in which photometric properties are improved by the arrangement in which the center of a Fresnel lens is displaced toward a photometry sensor.

The collection surface (the Fresnel lens) of a focusing glass is a circle concentric to the center of the optical axis of an object image. The power of the Fresnel lens (Fresnel angle) is set such that the light beam of the object image is primarily collected to the eye point of the optical path of a finder designed for use in observation.

In the configuration disclosed in Japanese Patent Laid-Open No. 2007-206169, since two Fresnel lenses whose Fresnel angles are different from each other are arranged in combination, the light beam of an object image is collected to different eye points depending on each Fresnel angle. This results in uneven distribution of the quantities of light incident on an object observed by the finder. Likewise, in the configuration disclosed in Japanese Patent Laid-Open No. 2009-3423, since the center of a Fresnel lens is displaced toward a photometry sensor, the light beam of an object image is displaced toward the photometry sensor. This results in uneven distribution of light quantities especially at the periphery of the field of view of a finder. As described above, it is difficult to efficiently distribute a light beam to both a finder and a photometry sensor with the configurations of conventional technologies.

SUMMARY OF THE INVENTION

The present invention provides a finder optical system, an image pickup apparatus, and an image pickup system which are capable of efficiently distributing light to a finder and a photometry sensor.

A finder optical system as an aspect of the present invention includes a focusing glass including a collection surface configured to collect a light beam obtained via an image pickup optical system and a diffusion surface configured to diffuse the light beam collected by the collection surface, an eyepiece configured to receive apart of the light beam diffused by the diffusion surface, a photometry lens arranged near the eyepiece, and a photometry sensor on which an image of another part of the light beam diffused by the diffusion surface is formed via the photometry lens, a plurality of micro lenses are arranged on the diffusion surface of the focusing glass, at least one micro lens of the plurality of micro lenses has at least two radii of curvature on its cross section in a predetermined direction, and the at least one micro lens satisfies R1<R2 where R1 is a radius of curvature in a first area of the micro lens where a distance between the first area and the photometry lens is smaller than a distance between a center of the micro lens and the photometry lens, and R2 is a radius of curvature in a second area of the micro lens where a distance between the second area and the photometry lens is greater than the distance between the center of the micro lens and the photometry lens.

An image pickup apparatus as another aspect of the invention includes the finder optical system.

An image pickup system as another aspect of the invention includes an image pickup optical system, and the image pickup apparatus configured to obtain an object image via the image pickup optical system.

Further features and aspects of the present invention will become apparent from the following description of exemplary embodiments with reference to the attached drawings.

BRIEF DESCRIPTION OF THE DRAWINGS

FIG. 2 is a simplified diagram of describing a finder optical system in Embodiment 1.

FIGS. 3A and 3B are cross-sectional views of a micro lens (micro lens arranged at the center of a field of view) in Embodiment 1.

DESCRIPTION OF THE EMBODIMENTS

Figure 1:
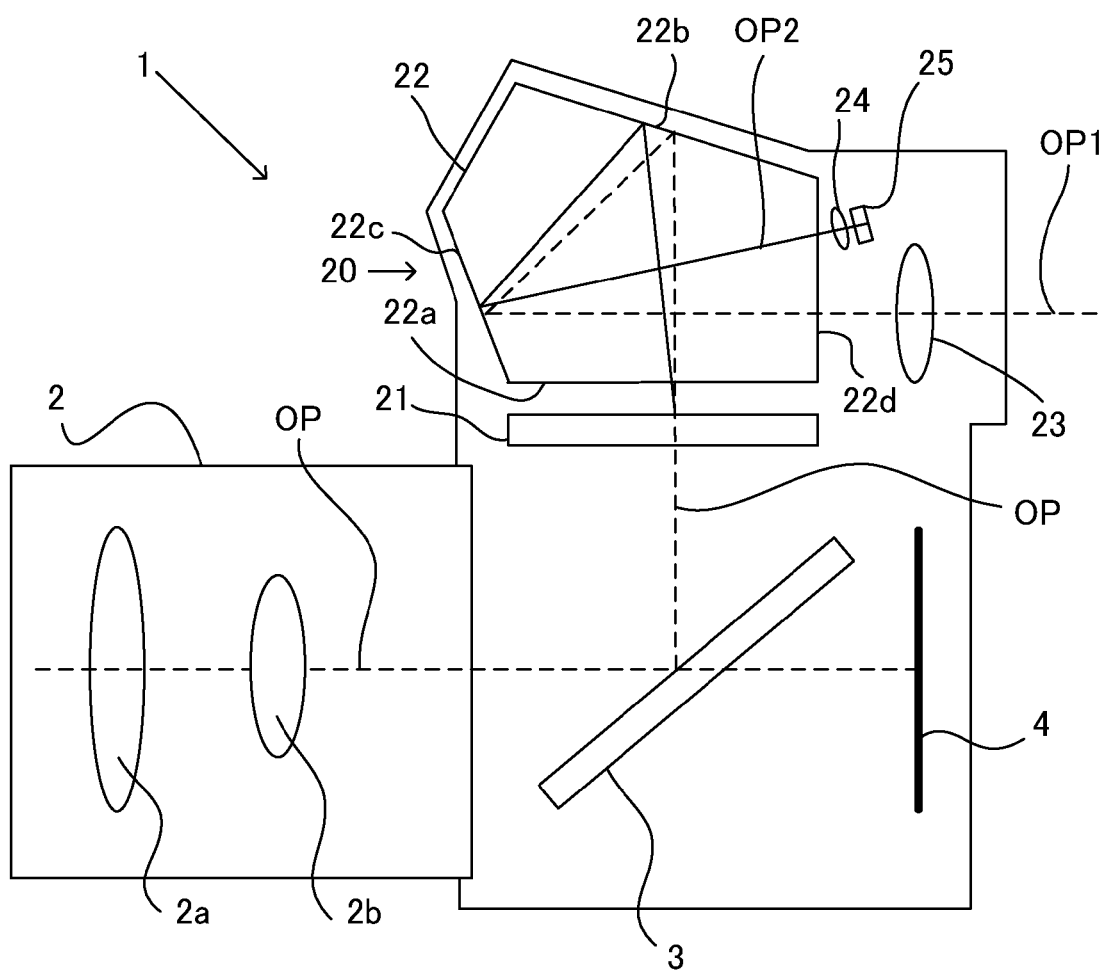
FIG. 1 is a configuration diagram of an image pickup apparatus (single lens reflex camera) in Embodiment 1.

Exemplary embodiments of the present invention will be described below with reference to the accompanied drawings. In each of the drawings, the same elements will be denoted by the same reference numerals and the duplicate descriptions thereof will be omitted.

Embodiment 1

First of all, referring to FIG. 1, a description will be given of an image pickup apparatus (image pickup system) in Embodiment 1 of the present invention. FIG. 1 is a configuration diagram of the image pickup apparatus (single lens reflex camera 1) in this embodiment. The single lens reflex camera 1 includes an imaging lens 2 (image pickup optical system), a quick return mirror 3, an imaging sensor 4 (image pickup element), and a finder optical system 20. The imaging lens 2 is removably mounted on the image pickup apparatus (camera body) which obtains an object image via the imaging lens 2. The combination of these components constitutes the image pickup system.

The finder optical system 20 includes a focusing glass 21, a pentaprism 22, and an eyepiece 23, each of which is arranged along an optical axis OP1 in order from an object side. The finder optical system 20 further includes a photometry lens 24 and a photometry sensor 25, each of which is arranged at the vicinity of the eyepiece 23 along an optical axis OP2 in order from the object side. A part of the light beam diffused by a diffusion surface 21b, which is described later, provided on the focusing glass 21 is incident on the eyepiece 23 so that an object image is formed on the eyes of an observer. An image of another part of the light beam diffused by the diffusion surface 21b, which is described later, is formed on the photometry sensor 25 via the photometry lens 24. The imaging lens 2 drives lens units 2a and 2b, both of which are contained therein, to perform focal length adjustment and focusing. The imaging lens 2 guides the object image into the single lens reflex camera 1.

When an object is observed with a finder, the quick return mirror 3 reflects an optical axis OP (object image) in a direction toward the focusing glass 21 at a position as illustrated in FIG. 1 (down position). On the other hand, when an object is shot, the quick return mirror 3 moves to a position (up position) which is upward from the position illustrated in FIG. 1 and the object image from the imaging lens 2 moves in a direction toward the imaging sensor 4. This means that each of the imaging sensor 4 and the focusing glass 21 is arranged at an optically conjugate position.

The pentaprism 22 guides a light beam obtained from the focusing glass 21 to the eyepiece 23. The light beam of the object image (inverted image) formed on the focusing glass 21 goes through an incident surface 22a, a first reflection surface 22b, a second reflection surface 22c, and an exit surface 22d of the pentaprism 22. This configuration causes the light beam (object image) incident into the pentaprism 22 to be flipped vertically and horizontally, and the resulting erected image can be observed with the eyepiece 23. A part of the diffusion light which is diffused at the focusing glass 21 is collected by the optical axis OP2 at the photometry lens 24 and an image is formed on the photometry sensor 25. This makes it possible to perform a photometric measurement of the object.

Referring now to FIG. 2, a description will be given of the configuration of the finder optical system 20. FIG. 2 is a simplified explanatory diagram (cross-sectional diagram in the Y direction (upward and downward directions in the field of view)) of the finder optical system 20. The focusing glass 21 of this embodiment has a collection surface 21a and a diffusion surface 21b. The collection surface 21a includes a Fresnel lens which causes an object image (light beam) obtained via the imaging lens 2 (image pickup optical system) to be collected in a direction toward the eyepiece 23. The light collection capability of the Fresnel lens makes it possible to observe, though the eyepiece 23, the object image obtained via the imaging lens 2 up to the vicinity thereof. The diffusion surface 21b has a plurality of micro lenses arranged thereon and configured to diffuse the light collected by the collection surface 21a.

In FIG. 2, a micro lens 21b-1 is a micro lens (a first micro lens) arranged on the upper side of a field of view. A micro lens 21b-2 is a micro lens arranged on the center of the field of view. A micro lens 21b-3 is a micro lens (a second micro lens) arranged on the lower side of the field of view. The object image is diffused by the action of each micro lens in directions toward the eyepiece 23 and the photometry lens 24, and in other directions (ineffective directions). As described above, the use of such diffusion light makes it possible to observe and perform photometry of an object image.

Referring now to FIGS. 3A and 3B, a description will be given of the effective optical surface (surface with optical functions) of the micro lens 21b-2 which constitutes a part of the diffusion surface 21b. FIGS. 3A and 3B are cross-sectional diagrams of the micro lens 21b-2. FIG. 3A is a cross-sectional diagram in the Y direction (upward and downward directions in the field of view direction), and FIG. 3B is a cross-sectional diagram in the X direction (left and right directions in the field of view). Both of FIGS. 3A and 3B illustrate the cross-section of the center position (diameter dimension) of the micro lens 21b-2. The micro lens 21b-2 is shaped such that the cross-sectional shape of the center position gently continues also on the cross-section of other than the center position.

As illustrated in FIG. 3A, the micro lens 21b-2 has two radii of curvature (a first radius of curvature R1 and a second radius of curvature R2) in the Y direction (in a predetermined direction). When a diameter (a size) of the effective optical surface is L, a position at a distance of (½)·L from an end E1 (or end E2) is defined as a center O of the micro lens 21b-2 (a center of a micro lens) as indicated by a dotted line. In this embodiment, the radius of curvature on the upper side in the field of view relative to the center O of the micro lens 21b-2 is set to the first radius of curvature R1, and the radius of curvature on the lower side in the field of view relative to the center O of the micro lens 21b-2 is set to the second radius of curvature R2. The relationship of these radii of curvature has R1<R2. On the other hand, as illustrated in FIG. 3B, the micro lens 21b-2 has a single radius of curvature in an X direction. In this embodiment, the micro lens 21b-2 only has to have at least two radii of curvature and may have three or more radii of curvature.

As described above, in this embodiment, the micro lens 21b-2 (at least one micro lens of the plurality of micro lenses) has at least two radii of curvature on the cross-section in the Y direction (a predetermined direction). The at least one micro lens satisfies R1<R2 where R1 is a radius of curvature on a side (a first area) closer to the photometry lens 24 than a center of the micro lens and R2 is a radius of curvature on a side (a second area) farther away from the photometry lens 24 than the center of the micro lens. In other words, R1 is a radius of curvature in the first area of the micro lens where a distance between the first area and the photometry lens is smaller than a distance between a center of the micro lens and the photometry lens, and R2 is a radius of curvature in the second area of the micro lens where a distance between the second area and the photometry lens is greater than the distance between the center of the micro lens and the photometry lens.

Figure 4A:
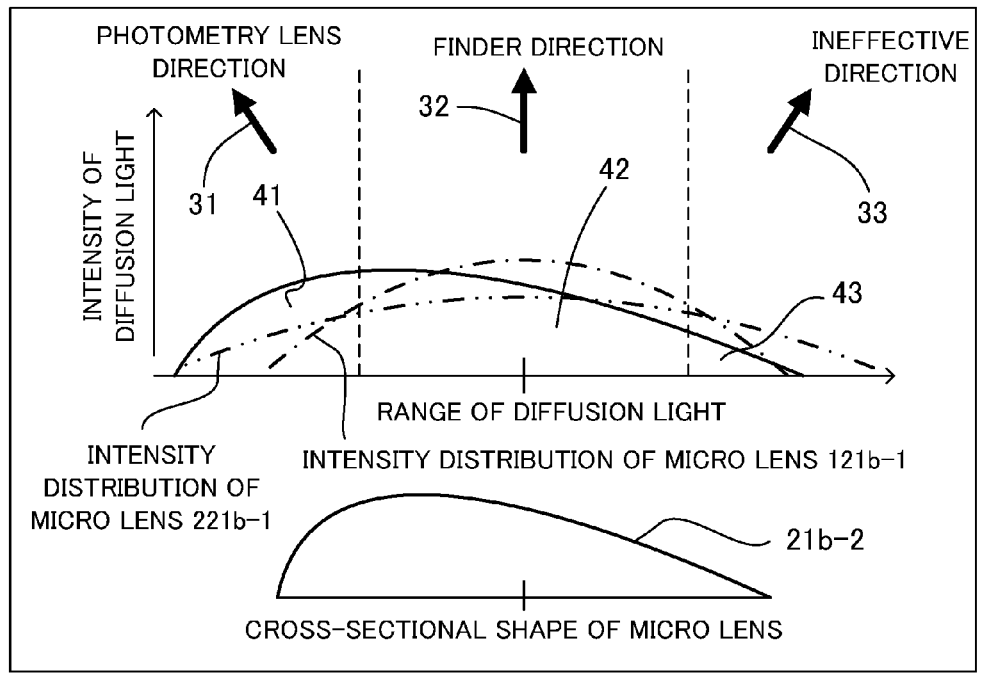
FIG. 4A is an intensity distribution diagram of the diffusion light from the micro lens arranged at the center of the field of view in Embodiment 1.
Figure 4B:
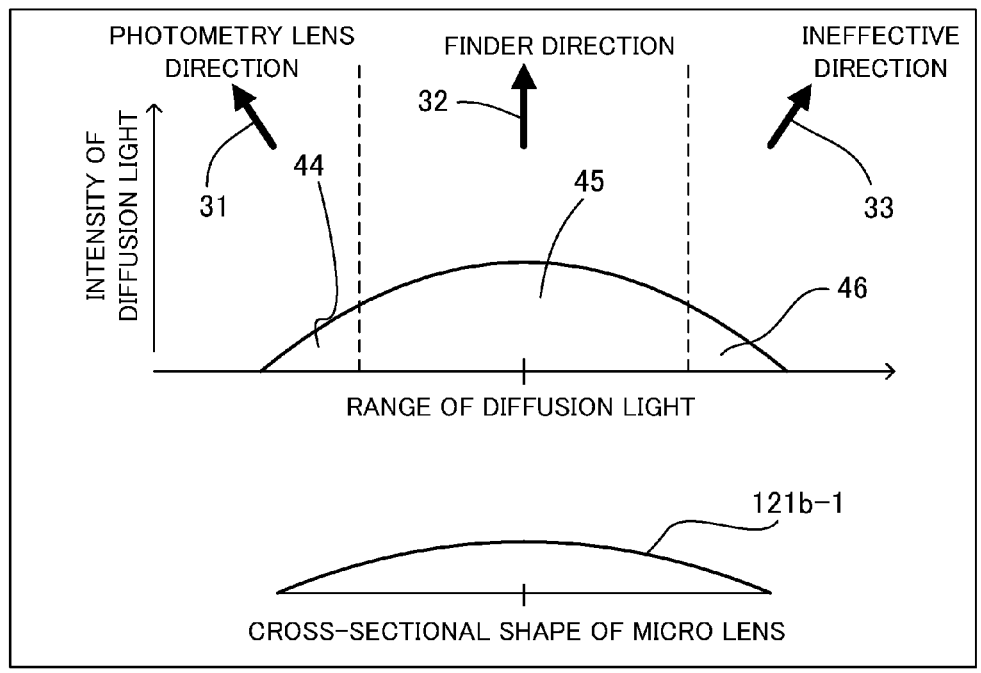
FIG. 4B is an intensity distribution diagram of the diffusion light from the micro lens as a comparative example.
Figure 4C:
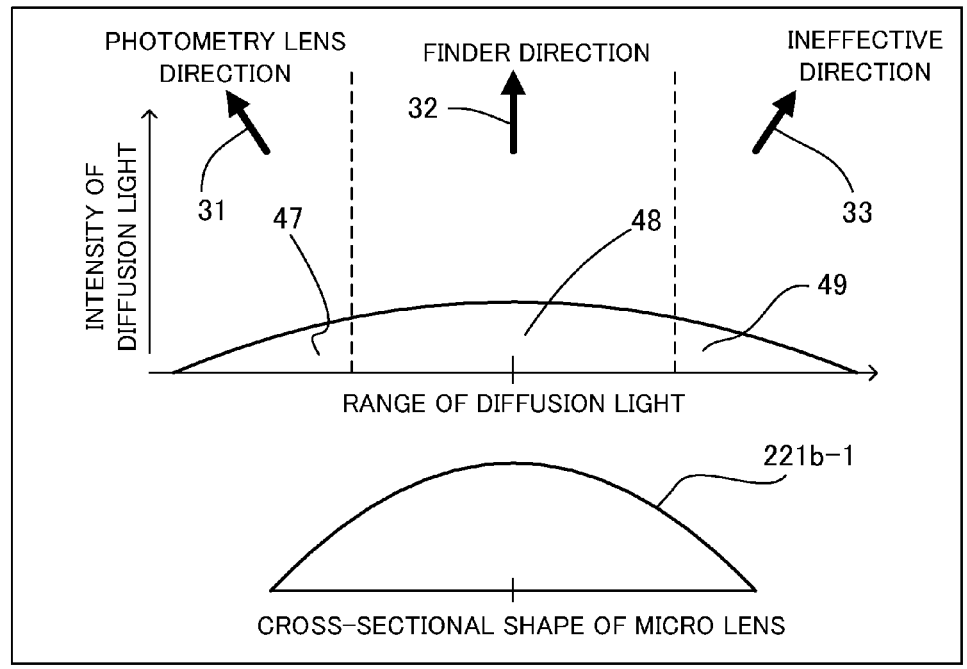
FIG. 4C is an intensity distribution diagram of the diffusion light from the micro lens as a comparative example.

Subsequently, referring to FIGS. 4A, 4B, and 4C, a description will be given of the relationship between the shape of a micro lens and the intensity of diffusion light (intensity distribution). FIG. 4A is the intensity distribution diagram of diffusion light with respect to the micro lens 21b-2 (the focusing glass 21) of this embodiment. FIG. 4B is the intensity distribution diagram of diffusion light with respect to the micro lens 121b-1 (the focusing glass 121) which has a single radius of curvature (a larger radius of curvature). FIG. 4C is the intensity distribution diagram of diffusion light with respect to the micro lens 221b-1 (the focusing glass 221) which has a single radius of curvature (a smaller radius of curvature). FIGS. 4B and 4C are illustrated as comparative examples.

In FIGS. 4A, 4B, and 4C, the directions of the diffusion light from each micro lens are herein defined as a photometry lens direction 31, a finder direction 32, and an ineffective direction 33 which is different from the photometry lens direction 31 and the finder direction 32. Each direction is separated by dashed lines. In FIGS. 4A, 4B, and 4C, the vertical axis indicates the intensity of the diffusion light (intensity distribution), and the horizontal axis indicates a range of the diffusion light. The area of each graph represents the amount of the diffusion light heading toward each direction. In FIG. 4A, the intensity distribution of the micro lens 121b-1 is indicated by a dashed-dotted line and the intensity distribution of the micro lens 221b-1 is indicated by a dashed-two dotted line for the purpose of comparison.

In FIG. 4A, the area of the intensity distribution 41 of the micro lens 21b-2 of this embodiment is the largest one in all intensities of the diffusion light heading toward the photometry lens direction 31. The second largest one is the area of the intensity distribution 47 (See FIG. 4C) of the micro lens 221b-1. The area of the intensity distribution 44 (See FIG. 4B) of the micro lens 121b-1 is smallest.

The results of the comparison among the intensities of the diffusion light heading toward the finder direction 32 in FIG. 4A are as follows. The area of the intensity distribution 42 of the micro lens 21b-2 of this embodiment and the area of the intensity distribution 45 (See FIG. 4B) of the micro lens 121b-1 of this embodiment are approximately the same. The area of the intensity distribution 48 (See FIG. 4C) of the micro lens 221b-2 is smallest.

In FIG. 4A, the area of the intensity distribution 43 of the micro lens 21b-2 of this embodiment is the smallest one in all intensities of the diffusion light heading toward the ineffective direction 33. The second smallest one is the area of the intensity distribution 46 (See FIG. 4B) of the micro lens 121b-1. The area of the intensity distribution 49 (See FIG. 4C) of the micro lens 221b-1 is largest. Each focusing glass includes the micro lenses arranged thereon whose shapes are the same, which means that the intensity distribution of the diffusion light from each micro lens represents the intensity distribution of each focusing glass.

Figure 4D:
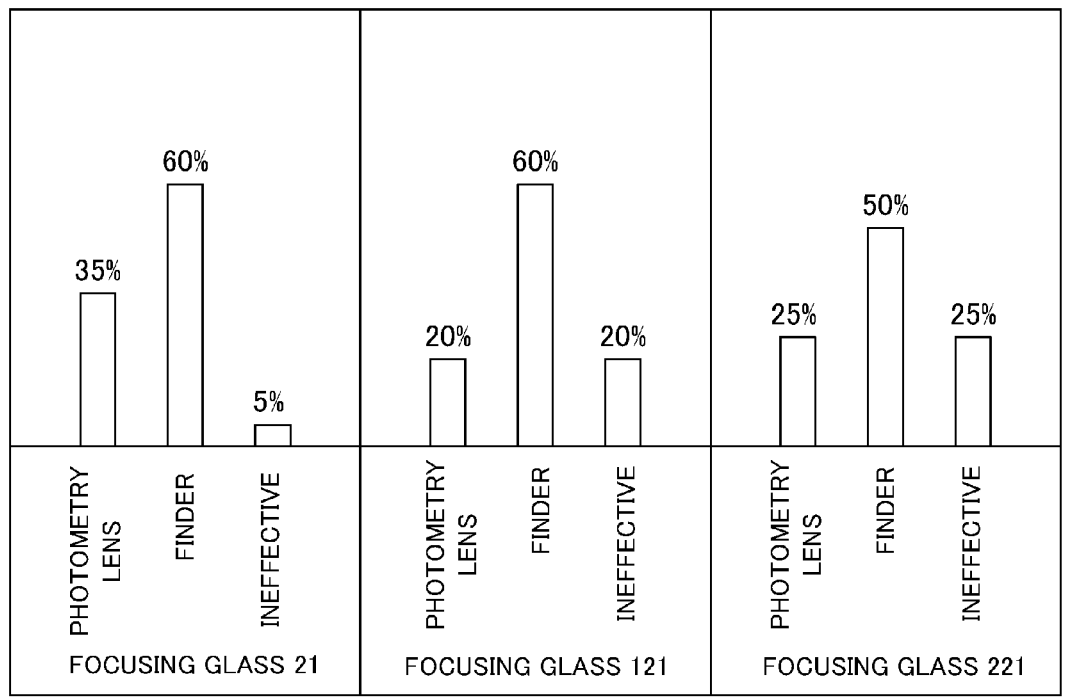
FIG. 4D is a diagram illustrating the percentages of the diffusion light in each direction from the micro lens in Embodiment 1 and the comparative examples.

FIG. 4D is a diagram illustrating the percentages (ratios of an light amount) accounted for by each direction of the diffusion lights of the focusing glasses 21, 121, and 221 having the micro lenses 21b-2, 121b-1, and 221b-1 thereon illustrated in FIGS. 4A to 4C, respectively. As illustrated in FIG. 4D, with respect to the focusing glasses 21 and 121, the diffusion light heading toward the finder direction 32 accounts for a large percentage. On the other hand, with respect to the focusing glasses 221, the diffusion light heading toward the photometry lens direction 31 accounts for a large percentage.

The use of the focusing glass 121 or 221 including micro lenses whose cross-section has a single radius of curvature makes it possible to control the properties of the diffusion light according to the radius of curvature. However, the intensity distribution of the diffusion light heading toward the photometry lens 31 and that of the diffusion light heading toward the finder direction 32 are in a trade-off relationship. In FIG. 4D, as can be understood from the relationship between the focusing glasses 121 and 221, for example, the intensity of the diffusion light heading toward the finder direction 32 is sacrificed as the intensity of the diffusion light heading toward the photometry lens direction 31 is raised. Furthermore, the intensity distribution of each micro lens with a single radius of curvature is symmetrical. Because of this, the intensity the diffusion light heading toward the photometry lens direction 31 and that of the diffusion light heading toward the ineffective direction 33 are the same. As described above, the use of the micro lens with the single radius of curvature results in an inevitable increase in the intensity of the diffusion light heading toward the ineffective direction 33 as the intensity of the diffusion light heading toward the photometry lens direction 31 is raised.

On the other hand, the use of the focusing glass 21 of this embodiment makes it possible to obtain an asymmetric intensity distribution, with a radius of curvature in the photometry lens direction 31 and each radius of curvature in non-photometry lens directions (finder direction 32 and ineffective direction 33) having different values from each other on the cross-section in the Y direction. As described above, the use of the micro lens 21b-2 makes it possible to raise the intensity of the diffusion light heading toward the photometry lens direction 31 while maintaining that of the diffusion light heading toward the finder direction 32. This means also that the diffusion lights can be effectively utilized because the radius of curvature in the photometry lens direction 31 is raised by the amount of a decrease in the intensity of the diffusion light heading toward the ineffective direction 33.

Figure 5A:
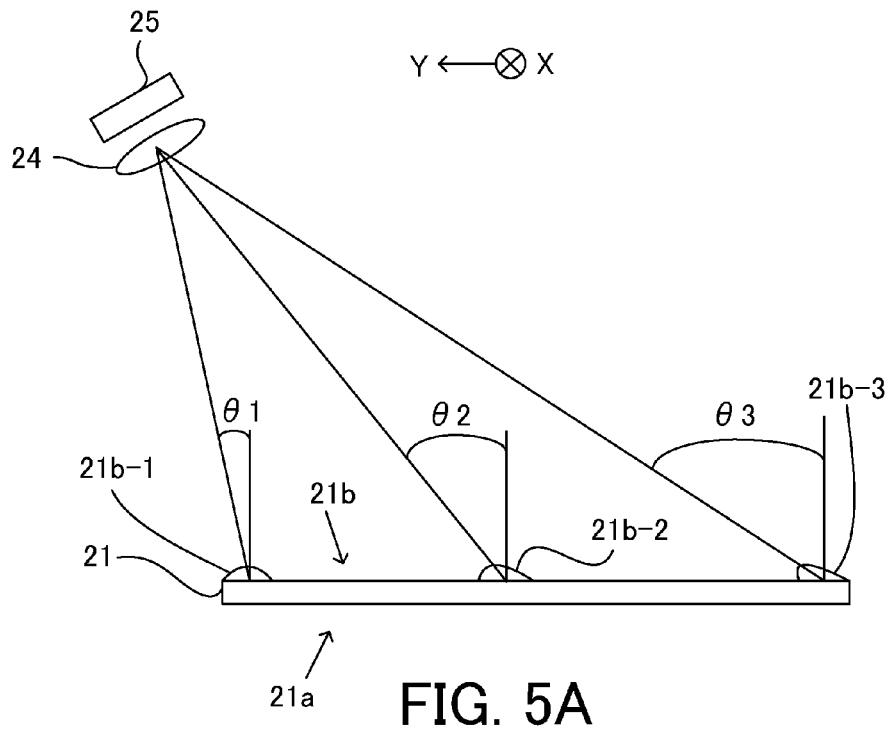
FIG. 5A is a diagram of describing the position relationship between a photometry lens and the micro lens in Embodiment 1.

Subsequently referring to FIG. 5A, a description will be given of the relationship between the position and the optimum shape of each micro lens in the arrangement of each micro lens of this embodiment on the diffusion surface 21b. FIG. 5A is an explanatory diagram of the position relationship between the photometry lens 24 and the micro lenses 21b-1, 21b-2, and 21b-3. In FIG. 5A, the pentaprism 22 is omitted. As illustrated in FIG. 5A, an angle (squint angle) between a line connecting the center of the micro lens 21b-1 located at the upper side of the field of view with the photometry lens 24 and a line vertically extending from the micro lens 21b-1 to the finder direction 32 is defined as θ1. An angle between a line connecting the center of the micro lens 21b-2 located at the center of the field of view with the photometry lens 24 and a line vertically extending from the micro lens 21b-2 to the finder direction 32 is defined as θ2. An angle between a line connecting the center of the micro lens 21b-3 located at the lower side of the field of view with the photometry lens 24 and a line vertically extending from the micro lens 21b-3 to the finder direction 32 is defined as θ3. In this situation, the relationship among the angles θ1, θ2, and θ3 satisfies θ1<θ2<θ3.

The arrangement of micro lenses whose shape is the same as that of the micro lens 21b-2 at all positions results in uneven intensity distribution of the diffusion lights heading in a direction toward the photometry lens 24 (photometry lens direction 31) due to the difference in angles. This arrangement results also in a change in the range in which diffusion light is ineffective. It is preferable to minimize the unevenness in the intensity of the diffusion light heading toward the photometry lens direction 31 and the range in which diffusion light is ineffective. Thus, it is preferable to optimize the radius of curvature of each micro lens of this embodiment by adjusting the radius of curvature R of each micro lens according to the position of the Y direction.

Figure 5B:
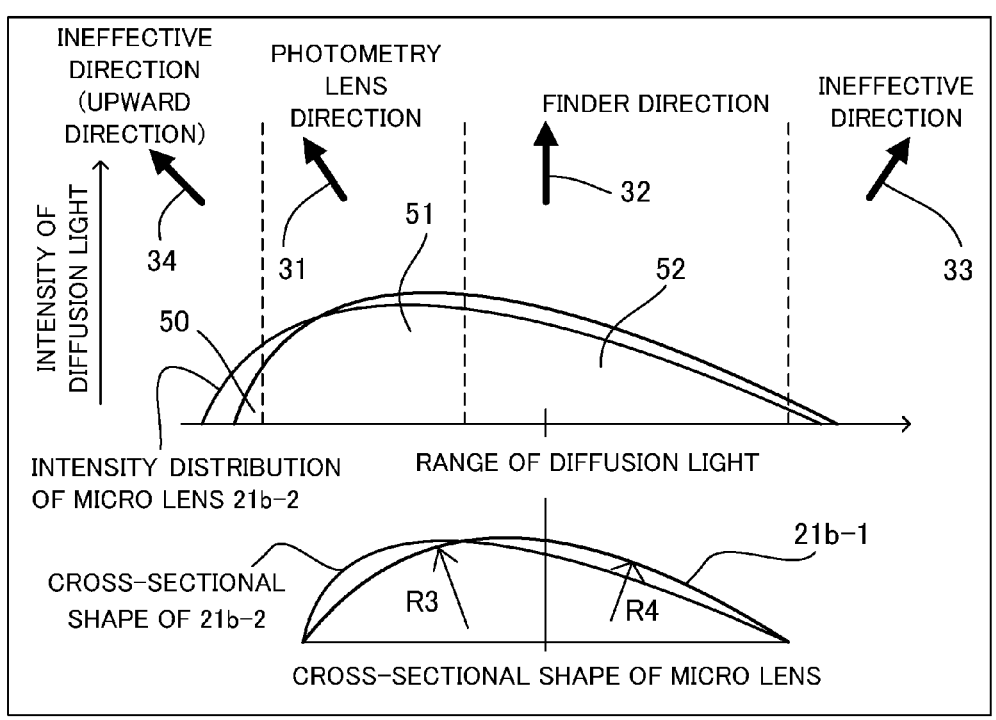
FIG. 5B is an intensity distribution diagram of the diffusion light from the micro lens arranged at the upper side of the field of view in Embodiment 1.

Subsequently, referring to FIG. 5B, a description will be given of the preferable shape of the micro lens 21b-1 (a first micro lens) arranged at the upper side of the field of view. FIG. 5B is an intensity distribution diagram of the diffusion light from the micro lens 21b-1. The cross-sectional shape of the micro lens 21b-2 arranged at the center of the field of view which is illustrated at the lower side of FIG. 5B is, for the purpose of comparison, indicated by narrow solid lines. Likewise, the intensity distribution of the diffusion light from the micro lens 21b-2 which is illustrated at the upper side of FIG. 5B is indicated by narrow solid lines. In comparison with the range of the diffusion light from the micro lens 21b-2, each of the ranges of the photometry lens direction 31, the finder direction 32, and the ineffective direction 33 is displaced to the right (the lower side of the field of view), with the ineffective direction (upward direction) 34 appearing at the left side of the photometry lens direction 31. In this situation, the range of the ineffective direction 33 becomes narrower.

If the micro lens 21b-2 is arranged at the position where the micro lens 21b-1 is located, the intensity of the diffusion light heading toward the ineffective direction (the upward direction) 34 is larger. In order to solve this problem, it is preferable that the first radius of curvature R3 of the micro lens 21b-1 is configured to be larger than the first radius of curvature R1 of the micro lens 21b-2. Similarly, it is preferable that the second radius of curvature R4 of the micro lens 21b-1 is configured to be smaller than the second radius of curvature R2 of the micro lens 21b-2. These shapes cause the intensity distribution of the diffusion light to be displaced in a direction toward the lower side of the field of view. Thus, it is possible to decrease the intensity of the diffusion light heading toward the ineffective direction (the upward direction) 34. As described above, the micro lens 21b-1 is capable of increasing areas 51 and 52 which represent the intensities of the diffusion light heading toward the photometry lens direction 31 and the finder direction 32 while decreasing an area 50 which represents the intensity of the diffusion light heading toward the ineffective direction (the upward direction) 34.

Figure 5C:
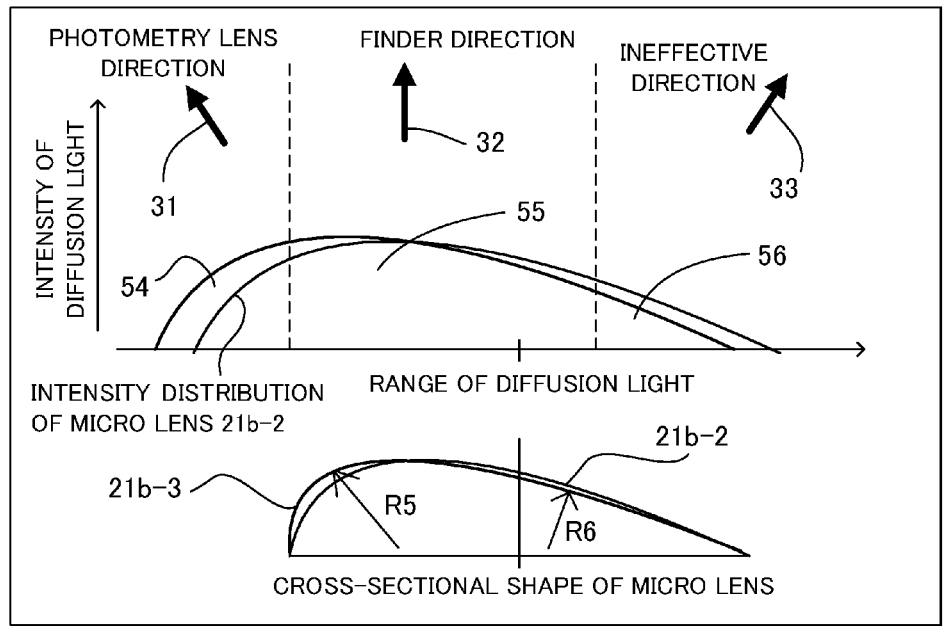
FIG. 5C is an intensity distribution diagram of the diffusion light from the micro lens arranged at the lower side of the field of view in Embodiment 1.

Subsequently, referring to FIG. 5C, a description will be given of the preferable shape of the micro lens 21b-3 (a second micro lens) arranged at the lower side of the field of view. FIG. 5C is an intensity distribution diagram of the diffusion light from the micro lens 21b-3. The cross-sectional shape of the micro lens 21b-2 arranged at the center of the field of view which is illustrated at the lower side of FIG. 5C is, for the purpose of comparison, indicated by narrow solid lines. Likewise, the intensity distribution of the diffusion light from the micro lens 21b-2 which is illustrated at the upper side of FIG. 5C is indicated by narrow solid lines. In comparison with the range of the diffusion light from the micro lens 21b-2, each of the ranges of the photometry lens direction 31, the finder direction 32, and the ineffective direction 33 is displaced to the left (the upper side of the field of view), with the area of the photometry lens direction 31 becoming narrower. In this situation, the range of the ineffective direction 33 becomes broader.

If the micro lens 21b-2 is arranged at the position where the micro lens 21b-3 is located, the intensity of the diffusion light heading toward the ineffective direction 33 becomes larger. In order to solve this problem, it is preferable that the first radius of curvature R5 of the micro lens 21b-3 is configured to be larger than the first radius of curvature R1 of the micro lens 21b-2. Likewise, it is preferable that the second radius of curvature R6 of the micro lens 21b-3 is configured to be smaller than the second radius of curvature R2 of the micro lens 21b-2. These shapes cause the intensity distribution of the diffusion light to be displaced in a direction toward the upper side of the field of view. Thus, it is possible to decrease the intensity of the diffusion light heading toward the ineffective direction 33. As described above, the micro lens 21b-3 is capable of increasing areas 54 and 55 which represent the intensities of the diffusion light heading toward the photometry lens direction 31 and the finder direction 32 while decreasing an area 56 which represents the intensity of the diffusion light heading toward the ineffective direction 34.

As described above, in this embodiment, the plurality of micro lenses include the micro lens 21b-1 (the first micro lens) and the micro lens 21b-3 (the second micro lens) that is arranged at a position located farther from the photometry lens 24 than a position of the micro lens 21b-1. In the embodiment, a radius of curvature on a side (a third area) of the micro lens 21b-1 which is closer to the photometry lens 24 than a center of the micro lens 21b-1 is defined as R3, and a radius of curvature on a side (a fourth area) of the micro lens 21b-1 which is farther from the photometry lens 24 than the center of the micro lens 21b-1 is defined as R4. In other words, R3 is a radius of curvature in the third area of the micro lens 21b-1 where a distance between the third area and the photometry lens 24 is smaller than a distance between a center of the micro lens 21b-1 and the photometry lens 24, and R4 is a radius of curvature in the fourth area of the micro lens 21b-1 where a distance between the fourth area and the photometry lens is greater than a distance between the center of the first micro lens and the photometry lens 24.

Similarly, a radius of curvature on a side (a fifth area) of the micro lens 21b-3 which is closer to the photometry lens 24 than a center of the micro lens 21b-3 is defined as R5, and a radius of curvature on a side (a sixth area) of the micro lens 21b-3 which is farther from the photometry lens 24 than the center of the micro lens 21b-3 is defined as R6. In other words, R5 is a radius of curvature in the fifth area of the micro lens 21b-3 where a distance between the firth area and the photometry lens 24 is smaller than a distance between the center of the micro lens 21b-3 and the photometry lens 24, and R6 is a radius of curvature in the sixth area of the micro lens 21b-3 where a distance between the sixth area and the photometry lens 24 is greater than the distance between the center of the micro lens 21b-3 and the photometry lens 24. In this situation, the relations of R3>R5 and R4<R6 are satisfied.

The relationship between the position and the optimum shape of each micro lens in this embodiment has been described with respect to three locations, that is, the center, the upper end, and the lower end of the diffusion surface of each focusing glass. With regard also to micro lenses arranged at locations other than these locations, it is preferable that the radius of curvature of each such micro lens is designed to be capable of collecting a large amount of diffusion light in the effective directions while minimizing the range in which the diffusion light is ineffective. In this situation, it is preferable that light is distributed in directions in which the brightness of the finder is even (approximately even) and the intensity distribution of light on the photometry sensor 25 is even (approximately even).

Figure 6:
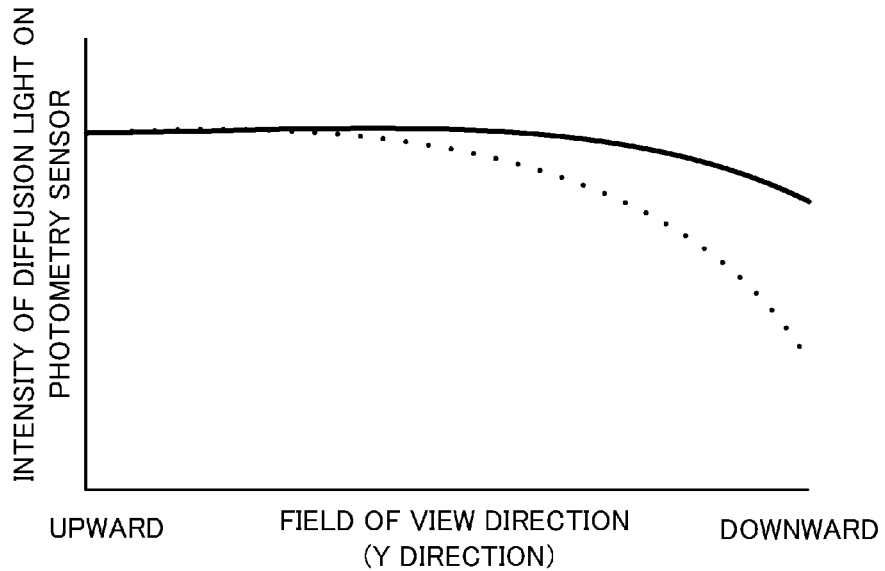
FIG. 6 is an intensity distribution diagram of the diffusion light on a photometry sensor arranged in upward and downward directions of the field of view (Y direction) in Embodiment 1.

Subsequently, referring to FIG. 6, a description will be given of the effects of this embodiment. FIG. 6 is an intensity distribution diagram of the diffusion light on the photometry sensor 25 in the Y direction, which depicts the intensity variation of the diffusion light on the focusing glass 21 in the upper and lower field of view directions. In FIG. 6, a dotted line depicts, as a comparative example, the intensity distribution of the diffusion light on the photometry sensor 25 which is observed in the case where the focusing glass 121 or the focusing glass 221 is arranged. As illustrated in FIG. 5A, an angle between the center axis of each micro lens and the photometry sensor 25 is larger as the field of view is lowered. This means that the number of diffusion light which reaches the photometry sensor 25 gradually decreases, resulting in a drop in the intensity of diffusion light at the lower side of the field of view direction (the Y direction). On the other hand, a solid line illustrated in FIG. 6 depicts the intensity distribution of diffusion light on the photometry sensor 25 which is observed in the case where the focusing glass 21 of this embodiment is arranged. The intensity distribution of diffusion light from each micro lens is adjusted such that the intensity distribution of diffusion light from the photometry sensor 25 is even (approximately even). This adjustment makes it possible to improve the drop in the intensity of diffusion light at the lower side of the field of view of the focusing glass 21.

Embodiment 2

Next, referring to FIGS. 7A and 7B, a description will be given of Embodiment 2 of the present invention.

Figure 7A:
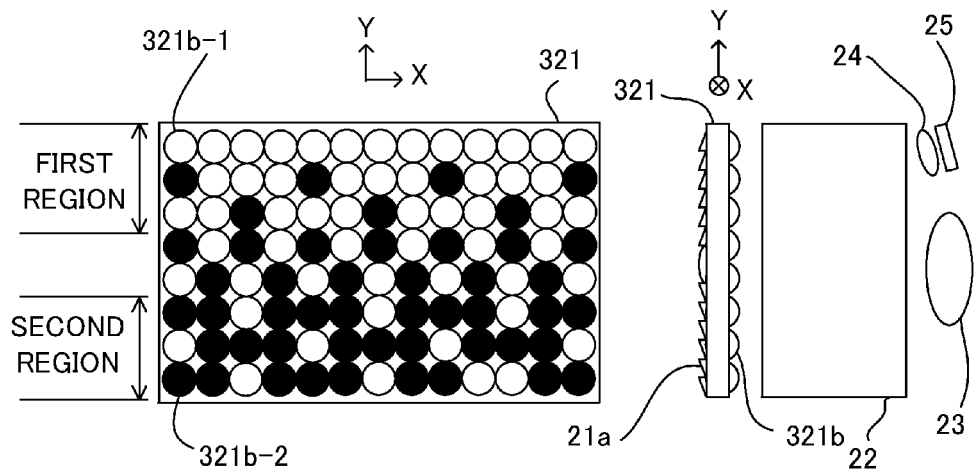
FIG. 7A is a configuration diagram of a focusing glass in Embodiment 2.

FIG. 7A is the configuration diagram of a focusing glass 321 according to this embodiment. This diagram illustrates a plurality of micro lenses arranged on the diffusion surface of the focusing glass 321. The X axis indicates the left and right field of view directions, and the Y axis indicates the upper and lower field of view directions. Micro lenses 321*b*-1 (third micro lenses) indicated with white circles are micro lenses designed to distribute light mainly to the finder, and micro lenses 321*b*-2 indicated with black circles are micro lenses designed to distribute light mainly to the photometry sensor 25.

Figure 7B:
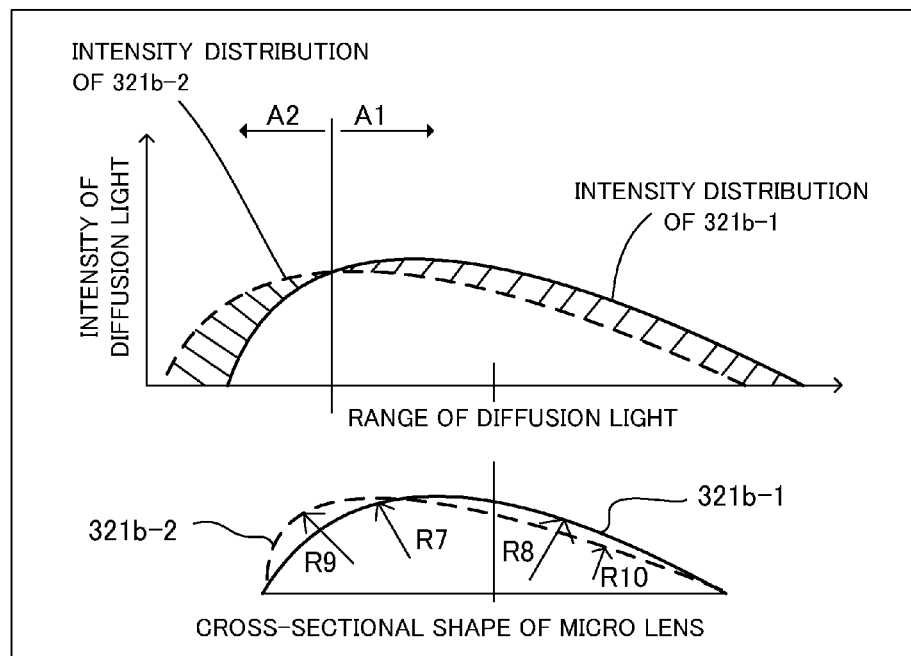
FIG. 7B is an intensity distribution diagram of the diffusion light from the micro lens in Embodiment 2.

FIG. 7B depicts the cross-sectional shapes of, and the intensity distributions of diffusion light from, each of the micro lenses 321*b*-1 and 321*b*-2. In FIG. 7B, the cross-sectional shape of the center position of the diameter (the dimension) in the field of view direction (the Y direction) of each micro lens 321*b*-1, and the intensity distribution of diffusion light from each micro lenses 321*b*-1 are indicated with solid lines. Similarly, the cross-sectional shape of the center position of the diameter (the dimension) in the field of view direction (the Y direction) of each micro lens 321*b*-2, and the intensity distribution of diffusion light from each micro lenses 321*b*-2 are indicated with broken lines.

In this embodiment, a first radius of curvature and a second radius of curvature of each micro lens 321*b*-1 are defined as R7 and R8, respectively, and a first radius of curvature and a second radius of curvature of each micro lens 321*b*-2 are defined as R9 and R10, respectively. That is to say, each micro lens 321*b*-1 is a third micro lens including a radius of curvature (the first radius of curvature R7) on a side (in a seventh area) of the micro lens 321*b*-1 which is closer to the photometry lens 24 than a center of the micro lens 321*b*-1 and a radius of curvature (the second radius of curvature R8) on a side (in a eighth area) of the micro lens 321*b*-1 which is farther from the photometry lens 24 than the center of the micro lens 321*b*-1. In other words, R7 is a radius of curvature in the seventh area of the micro lens 321*b*-1 where a distance between the seventh area and the photometry lens 24 is smaller than a distance between the center of the micro lens 321*b*-1 and the photometry lens 24, and R8 is a radius of curvature in the eighth area of the micro lens 321*b*-1 where a distance between the eighth area and the photometry lens 24 is greater than the distance between the center of the micro lens 321*b*-1 and the photometry lens 24.

Each micro lens 321*b*-2 is a fourth micro lens including a radius of curvature (the first radius of curvature R9) on a side (in a ninth area) of the micro lens 321*b*-2 which is closer to the photometry lens 24 than a center of the micro lens 321*b*-2, and a radius of curvature (the second radius of curvature R10) on a side (in a tenth area) of the micro lens 321*b*-2 which is farther from the photometry lens 24 than the center of the micro lens 321*b*-2. In other words, R9 is a radius of curvature in the ninth area of the micro lens 321*b*-2 where a distance between the ninth area and the photometry lens 24 is smaller than a distance between the center of the micro lens 321*b*-2 and the photometry lens 24, and R10 is a radius of curvature in the tenth area of the micro lens 321*b*-2 where a distance between the tenth area and the photometry lens 24 is greater than the distance between the center of the micro lens 321*b*-2 and the photometry lens 24. In this embodiment, each of the radii of curvature (the first and second radii of curvature) is designed to satisfy the relations of R7>R9 and R8<R10.

With this design, each micro lens 321*b*-1 can cause the intensity of diffusion light to be increased by the area which is indicated with oblique lines and is in the lower field of view direction (A1 side), compared with each micro lens 321*b*-2. Likewise, each micro lens 321*b*-2 can cause the intensity of diffusion light to be increased by the area which is indicated with oblique lines and is in the upper field of view direction (A2 side), compared with each micro lens 321*b*-1.

As described above with reference to FIG. 6, in the comparative examples, the drop (the broken line illustrated in FIG. 6) in the intensity of diffusion light on the photometry sensor 25 in the lower field of view direction occurs. In contrast, the focusing glass 321 of this embodiment has a larger number of micro lenses 321*b*-2 and a smaller number of micro lenses 321*b*-1 at the lower side of the field of view where a drop in the intensity of diffusion light may occur. This makes it possible to increase the intensity of the diffusion light heading toward the photometry lens 24. This results also in an arrangement in which the number of the micro lenses 321*b*-2 gradually decreases and that of the micro lenses 321*b*-1 gradually increases at the higher portion of the field of view.

That is to say, in this embodiment, as illustrated in FIG. 7A, the number of micro lenses 321*b*-1 is larger than the number of micro lenses 321*b*-2 in a region (a first region of the diffusion surface 321*b*) which is closer to the photometry lens 24. On the other hand, the number of the micro lenses 321*b*-2 is larger than the number of micro lenses 321*b*-1 in a region (a second region of the diffusion surface 321*b*) which is farther from the photometry lens 24, i.e. a distance between the second region and the photometry lens 24 is greater than a distance between the first region and the photometry lens 24. Thus, the ratio of the micro lenses 321*b*-1 and the micro lenses 321*b*-2 is changed depending on the variation (in the field of view direction) in the intensity of diffusion light illustrated in FIG. 6 to be able to achieve even (approximately even) distribution of the intensity of diffusion light on the photometry sensor 25.

Micro lenses with a single radius of curvature (relatively large radius of curvature) may also be used as the micro lenses 321*b*-1. This is because it is sufficient if the intensity of the diffusion light heading toward the lower field of view A1 is larger than that of the micro lenses 321b-2. In this situation, the first radius of curvature R7 and the second radius of curvature R8 of each of the micro lenses 321b-1 satisfy the relation of R7=R8.

In Embodiments 1 and 2, the optimum shape of each micro lens has been described with the assumption that the photometry lens 24 and the photometry sensor 25 are arranged near (at the vicinity of) the upper side of the eyepiece 23. Each embodiment, however, is not limited to this. The shape of each micro lens may be adjusted to have an optimum shape according to the positions of the photometry lens 24 and the photometry sensor 25. In each embodiment, the configurations have been described in which the shape of each micro lens is optimum in the Y direction (upper and lower field of view directions) in terms of the distribution of diffusion light. Each embodiment, however, is not limited to this. The radius of curvature (R shape) of each micro lens may also be adjusted so as to make the distribution of diffusion light in the X direction (left and right field of view directions) optimum.

According to each of the embodiments described above, a finder optical system, an image pickup apparatus, and an image pickup system, each of which is capable of efficiently distributing light to a finder and a photometry sensor can be provided. In addition, according to the configuration of each embodiment, fine adjustments of light distribution can be performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-008332, filed on Jan. 21, 2013, which is hereby incorporated by reference herein in its entirety.

What is claimed is:

1. A finder optical system comprising:
   a focusing glass including a collection surface configured to collect a light beam obtained via an image pickup optical system and a diffusion surface configured to diffuse the light beam collected by the collection surface;
   an eyepiece configured to receive apart of the light beam diffused by the diffusion surface;
   a photometry lens arranged near the eyepiece; and
   a photometry sensor on which an image of another part of the light beam diffused by the diffusion surface is formed via the photometry lens,
   wherein a plurality of micro lenses are arranged on the diffusion surface of the focusing glass,
   wherein at least one micro lens of the plurality of micro lenses has at least two radii of curvature on its cross section in a predetermined direction, and
   wherein the at least one micro lens satisfies R1<R2 where R1 is a radius of curvature in a first area of the micro lens where a distance between the first area and the photometry lens is smaller than a distance between a center of the micro lens and the photometry lens, and R2 is a radius of curvature in a second area of the micro lens where a distance between the second area and the photometry lens is greater than the distance between the center of the micro lens and the photometry lens.

2. The finder optical system according to claim 1,
   wherein the plurality of micro lenses include a first micro lens and a second micro lens that is arranged at a position located farther from the photometry lens than a position of the first micro lens, and
   wherein R3>R5 and R4<R6 are satisfied where R3 is a radius of curvature in a third area of the first micro lens where a distance between the third area and the photometry lens is smaller than a distance between a center of the first micro lens and the photometry lens, R4 is a radius of curvature in a fourth area of the first micro lens where a distance between the fourth area and the photometry lens is greater than the distance between the center of the first micro lens and the photometry lens, R5 is a radius of curvature in a fifth area of the second micro lens where a distance between the fifth area and the photometry lens is smaller than a distance between a center of the second micro lens and the photometry lens, and R6 is a radius of curvature in a sixth area of the second micro lens where a distance between the six area and the photometry lens is greater than the distance between the center of the second micro lens and the photometry lens.

3. The finder optical system according to claim 1,
   wherein the plurality of micro lenses include:
   a plurality of third micro lenses, each having a radius of curvature R7 in a seventh area of the third micro lens where a distance between the seventh area and the photometry lens is smaller than a distance between a center of the third micro lens and the photometry lens, and a radius of curvature R8 in an eighth area of the third micro lens where a distance between the eighth area and the photometry lens is greater than the distance between the center of the third micro lens and the photometry lens; and
   a plurality of fourth micro lenses, each having a radius of curvature R9 in a ninth area of the fourth micro lens where a distance between the ninth area and the photometry lens is smaller than a distance between a center of the fourth micro lens and the photometry lens, and a radius of curvature R10 in a tenth area of the fourth micro lens where a distance between the tenth area and the photometry lens is greater than the distance between the center of the fourth micro lens and the photometry lens,
   wherein the radii of curvature R7, R8, R9, and R10 satisfy R7>R9 and R8<R10,
   wherein the diffusion surface has a first region on which the plurality of third micro lenses and the plurality of fourth micro lenses are arranged, the number of the plurality of third micro lenses being larger than the number of the plurality of fourth micro lenses, and
   wherein the diffusion surface has a second region located farther from the photometry lens than the first region and on which the plurality of third micro lenses and the plurality of fourth micro lenses are arranged, the number of the plurality of fourth micro lenses being larger than the number of the plurality of third micro lenses.

4. The finder optical system according to claim 3,
   wherein each of the plurality of third micro lenses satisfies R7=R8 and has a single radius of curvature.

5. An image pickup apparatus comprising the finder optical system according to claim 1.

6. An image pickup system comprising:
an image pickup optical system; and
the image pickup apparatus according to claim 5, configured to obtain an object image via the image pickup optical system.

\* \* \* \* \*